United States Patent [19]
Perkins

[11] 4,088,957
[45] May 9, 1978

[54] METHOD AND APPARATUS FOR SYNCHRONOUSLY DETECTING A DIFFERENTIALLY ENCODED CARRIER SIGNAL

[75] Inventor: William C. Perkins, Sachse, Tex.

[73] Assignee: Rockwell International Corporation, El Segundo, Calif.

[21] Appl. No.: 759,946

[22] Filed: Jan. 17, 1977

[51] Int. Cl.$^2$ ............................................. H04B 1/16
[52] U.S. Cl. ...................................... 325/320; 178/88
[58] Field of Search ........................... 178/67, 88, 68; 325/320, 324, 38 A, 38 B; 329/146; 358/140, 261, 105

[56] References Cited

U.S. PATENT DOCUMENTS

| | | | |
|---|---|---|---|
| 3,139,615 | 6/1964 | Aaron | 325/38 A |
| 3,368,038 | 2/1968 | Carter | 178/67 |
| 3,622,885 | 11/1971 | Kruszynski | 325/38 B |
| 3,815,034 | 6/1974 | Kato | 325/320 |
| 3,830,971 | 8/1974 | Van de Polder | 358/140 |
| 3,937,871 | 2/1976 | Robinson | 358/261 |
| 3,940,555 | 2/1976 | Amano | 325/38 B |
| 4,007,331 | 2/1977 | Flanagan | 178/67 |

*Primary Examiner*—Robert L. Griffin
*Assistant Examiner*—Michael A. Masinick
*Attorney, Agent, or Firm*—Howard R. Greenberg; H. Fredrick Hamann

[57] ABSTRACT

A differentially encoded carrier signal is synchronously detected by generating an output signal indicative of the carrier signal characteristic in each transmitted bit interval during the interval, storing it so that in the next bit interval it can be compared against the output signal for the immediately preceding transmitted bit interval to establish the characteristic differential to demodulate its information and forcing the output signal to zero in a subsequent bit interval after first using it as a reference for comparison with the output signal for the immediately succeeding transmitted bit interval to demodulate its information.

10 Claims, 3 Drawing Figures

METHOD AND APPARATUS FOR SYNCHRONOUSLY DETECTING A DIFFERENTIALLY ENCODED CARRIER SIGNAL

BACKGROUND OF THE INVENTION

The present invention pertains generally to detectors for demodulating digitalized information contained in communications carrier signals and particularly differentially encoded carrier signals.

Differentially encoded carrier signal systems for transmitting and receiving communications signals, wherein the information is contained in the differential of a characteristic of the carrier signal (phase, frequency, or amplitude) between consecutive bit intervals thereof are widely used. In these systems, the information is demodulated by comparing the carrier signal characteristic in each bit interval with the immediately preceding bit interval, the latter serving as a reference. For example, one commercial system known as Kineplex which is covered by U.S. Pat. No. 3,368,036, entitled "Demultiplexing & Detecting System For Predicted Wave Phase-Pulsed Data Transmission System" issued to R. C. Carter et al permits two bits of binary data to be transmitted and received per bit interval through differential phase shift keying where the carrier signal in a given bit interval can assume any one of four different phases with respect to the immediately preceding bit interval in odd multiples of 45°. Although this system is highly effective at low data rates, the constraints imposed by the storage and sampling scheme for comparing the information contained in consecutive bit intervals militates against extending its utilization to the higher data rates finding current popularity. Moreover, the dual functions performed in each bit interval results in timing circuitry which is more sophisticated and expensive than otherwise required.

With the foregoing in mind, it is a primary object of the present invention to provide a new and improved means for synchronously detecting and demodulating the information contained in differentially encoded carrier signals.

It is a further object of the present invention to provide such a new and improved means which is particularly advantageous for use with carrier signals of the differential phase shift keying type.

It is still a further object of the present invention to provide such a new and improved means which affords extending the use of differential phase shift keyed carrier signals at higher data rates with simplified timing circuitry.

The foregoing objects, as well as others, and the means by which they are achieved through the present invention may best be appreciated by referring to the Detailed Description of the Preferred Embodiment which follows hereinafter together with the appended drawings.

BRIEF DESCRIPTION OF THE INVENTION

In accordance with the foregoing objects, the present invention affords synchronous detection and demodulation of information differentially encoded in the consecutive bit intervals of a carrier signal via some characteristic thereof by generating an output signal indicative of the signal characteristic of each transmitted bit interval during that interval, storing it so that during the next bit interval it can be compared with the output signal for the immediately preceding bit interval to establish the characteristic differential to demodulate its information and forcing the output signal to zero in a subsequent bit interval after first using it as a reference for comparison with the output signal for the immediately succeeding bit interval to demodulate the latter information. In the preferred embodiment, three different receiver circuits are employed to implement a repetitive three-bit interval sequence wherein the third bit interval of the sequence is used to disable the receiver circuit (force its output to zero) that was enabled (to generate the output signal) in the first bit interval of the sequence as well as to employ the output signal as a reference for comparison with the output of the receiver circuit enabled during the second bit interval to demodulate the information contained therein preparatory to receiving the first bit interval in the ensuing sequence. In an alternative arrangement, a four-bit interval sequence is employed wherein the third bit interval serves strictly for comparing the output signal as a reference and the fourth bit interval is employed strictly for driving it to zero.

DETAILED DESCRIPTION OF THE PREFERRED EMBODIMENT

For convenience, the invention will be described in connection with carrier signals of the differential phase shift keying type as delineated in the Carter patent previously alluded to under Background of the Invention. Specifically, the carrier signal consists of a stream of bit intervals, each of period T, wherein its phase is shifted during each interval by some odd multiple of 45° from the immediately preceding interval, thus allowing four different phase states for defining two bits of binary data during each interval. If $\theta_n$ represents the carrier signal phase during some bit interval (fixed to one absolute reference) and $\theta_{n+1}$ represents its phase during the immediately succeeding bit interval, the two bits represented in the latter interval may be determined by the sin and cos of the differential phase demodulated information as follows (in accordance with the Carter patent format):

| $\theta_n - \theta_{n+1}$ | Sin $(\theta_n - \theta_{n+1})$ | Cos $(\theta_n - \theta_{n+1})$ | Bit 1 | Bit 2 |
|---|---|---|---|---|
| 45° | + | + | Mark | Mark |
| 135° | + | − | Mark | Space |
| 225° | − | − | Space | Space |
| 315° | − | + | Space | Mark |

The system described in the Carter patent engenders developing a signal indicative of the carrier signal phase in each transmitted bit interval, comparing it against the phase of the immediately preceding bit interval (which has been stored for that purpose) in the same transmitted bit interval and then using it as a reference in the next interval before disposing of it in that interval. As will be appreciated upon a reading of this reference, the constraints imposed upon the storage devices, namely, the integrating circuits, which must be cleared out preparatory to receiving new information in subsequent bit intervals, intrinsically inhibit extending the system to higher data rates. For instance, aside from the timing problems created by the performance of dual functions during each bit interval, the finite time required for discharging the integrators during each interval (which must be essentially discharged to zero to avoid subsequent errors) detracts from using the bit interval period of T efficiently, such as by foreshortening it to achieve higher data rates. This problem is greatly exacerbated when the detector is used in conjunction with frequency multiplexed signals which, as the patent discusses, necessitates precise timing with respect to the various carrier frequencies so as to minimize cross-talk.

Figure 1:
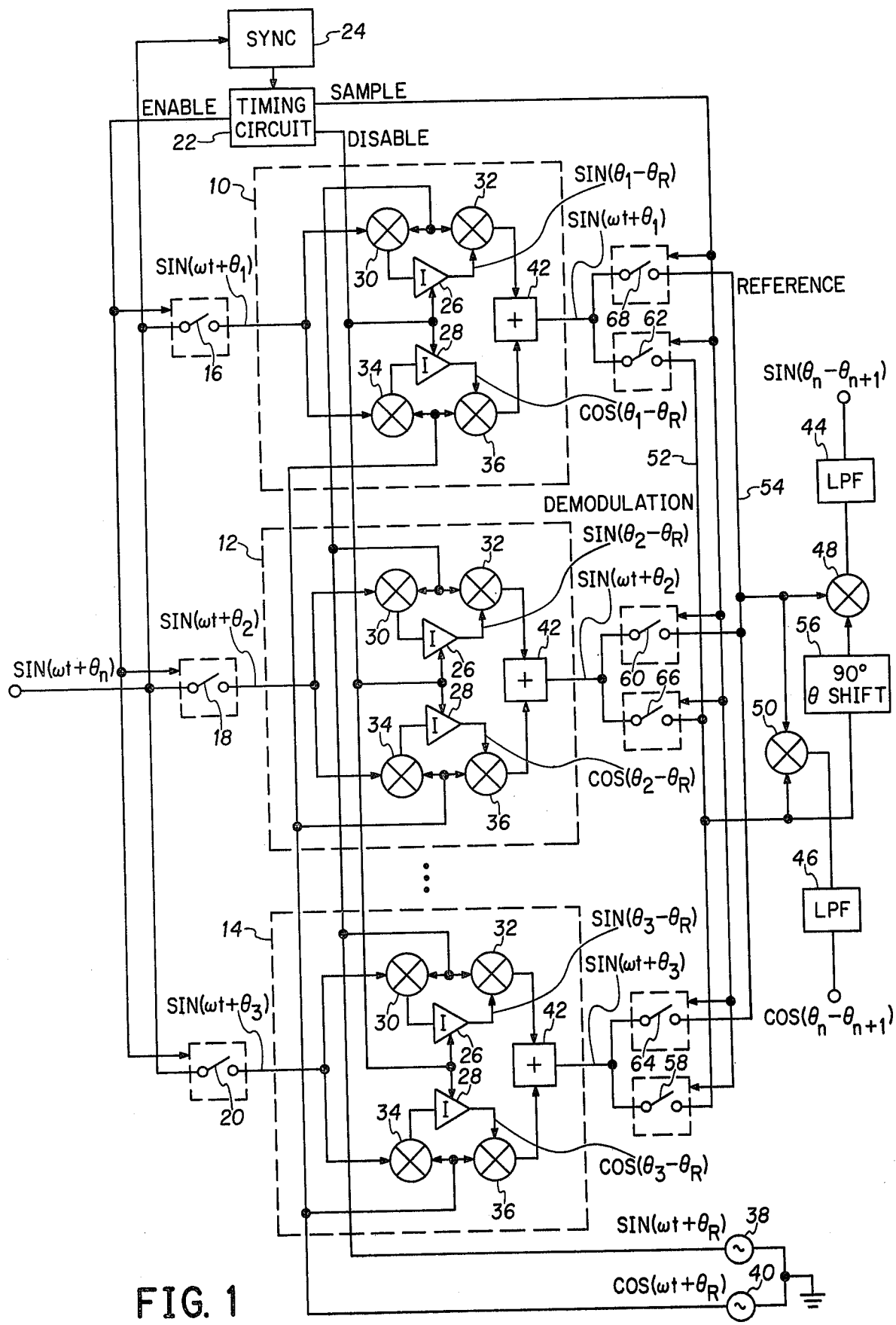
FIG. 1 is a functional diagram depicting the preferred embodiment of the invention.

Looking now to FIG. 1, it will be seen that the invention herein comprises at least three similar receiver circuits 10, 12, and 14, each for receiving the carrier signal, represented as $\sin(\omega t + \theta_n)$, when enabled to do so by the closure of individual symbolic switches 16, 18, and 20, respectively, associated therewith. The enable signal for controlling the aforesaid switches is generated by a timing circuit 22 in synchronism with the bit intervals of the carrier signal (each bit interval being defined by the subscript of $\theta$) by a synchronizing circuit 24 through which the carrier signal is applied thereto, for example, preferably to make each enablement period coincident with a bit interval period T. The enable signal is sequentially applied to switches 16–20 to allow their respective receiver circuits 10–14 to sequentially receive the carrier signal, each during a successive bit interval. Thus, the receiver circuit 10 might be connected to receive a first bit interval ($n = 1$) wherein the phase of $\theta$ of the carrier signal is $\theta_1$. Receiver 12 would then be connected to receive the next or second bit interval wherein $\theta_2$ represents the phase of the carrier during that interval. Similarly, the receiver circuit 14 would be connected to receive the third bit interval in this sequence wherein the carrier signal has a phase $\theta_3$. Assuming the presence of only three receiver circuits 10–14 (the dotted line between receivers 12 and 14 indicating that more than three receivers can be employed to effect a sequence of more than three bit intervals), the foregoing three-bit interval sequence would then be repeated on a periodic basis for succeeding bit intervals.

Since all the components of FIG. 1, as well as the trigonometric operations performed thereby, are detailed in the Carter patent, a cursory exposition will be indulged herein only sufficient to understand the subject invention. Each receiver circuit 10–14 generates an output signal indicative of the carrier phase $\theta_n$ of the bit interval applied thereto during that interval when enabled, which is then stored throughout the next bit interval so that it may be compared against the phase of the immediately preceding bit interval to demodulate the bit information contained therein and is partially stored during the next succeeding interval where it is used as a reference signal for comparison with the immediately succeeding bit interval before the information is disposed of preparatory to receiving new phase information. The output signal which is the reconstructed carrier signal itself (method 2 of the Carter patent as depicted in FIGS. 6 and 9, thereof, although it will be realized hereinafter that the subject invention is equally applicable to method 1 of the Carter patent) is generated and stored through the use of a pair of integrators 26 and 28 interconnected between a pair of mixers 30, 32 and 34, 36, respectively. Particular mixers and integrators eminently suited for this application are detailed in a companion U.S. Pat. No. 3,369,185 issued to R. C. Carter entitled, "RC Correlator Circuit For Synchronous Signal Detection." Mixers 30 and 34 receive the carrier signal when the associated receiver circuit switch 16–20 is closed for multiplication respectively with sinusoids $\sin(\omega t + \theta_r)$ and $\cos(\omega t + \theta_r)$ derived respectively from A. C. generators 38 and 40. Upon integration, the product outputs of mixers 30 and 34 appear at the outputs of integrators 26 and 28, respectively, as $\sin(\theta_n - \theta_r)$ and $\cos(\theta_n - \theta_r)$ which are D. C. signals whose polarity taken together define the phase of the carrier signal in bit interval $n$ with respect to some reference $\theta_r$. These D. C. signals are multiplied respectively by $\sin(\omega t + \theta_r)$ and $\cos(\omega t + \theta_1)$ in respective mixers 32 and 36 whose product outputs are added together in adder circuit 42 to afford an output signal which is a reconstruction of the carrier signal applied to the associated receiver circuit during the transmitted bit interval. This is shown in FIG. 1, where $\sin(\omega t + \theta_1)$ appears at the output of receiver 10 beginning with the first bit interval, $\sin(\omega t + \theta_2)$ appears at the output of receiver 12 beginning with the second bit interval and $\sin(\omega t + \theta_3)$ appears at the output of receiver 14 beginning with the third bit interval.

Figures 2, 3:
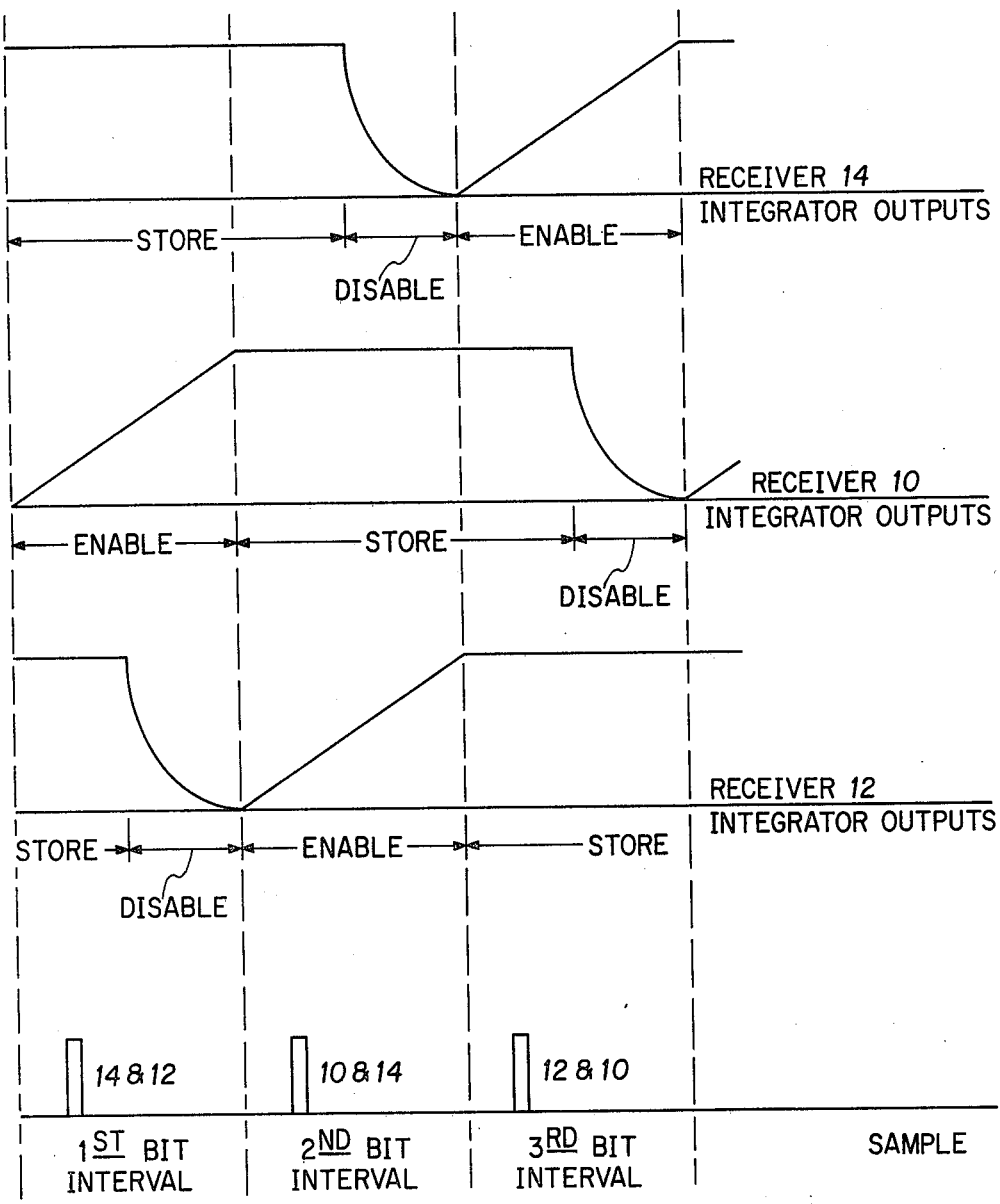
FIG. 2 is a series of waveforms helpful to understanding the invention for implementing the embodiment of FIG. 1 in a repetitive three-bit interval sequence.
FIG. 3 depicts a repetitive four-bit interval sequence which may be employed with the preferred embodiment.

The output signal is stored by virtue of integrators 26 and 28 until they are disabled in response to a disable signal from timing circuit 22 to force their outputs to zero preparatory to receiving new information in a successive bit interval. The disablement of the receiver circuits 10–14 occurs in the same sequence as their enablement with the respective bit intervals being separated by at least one bit interval as shown in the waveforms of FIG. 2. Thus, in the first bit interval depicted, receiver circuit 10 is enabled so that the D. C. outputs of its integrators 26 and 28 increase linearly (it being understood that either or both outputs can be negative as well as positive as shown dependent on $\theta_n$) while receiver circuit 12 is disabled and the output of receiver circuit 14 is stored. In the next bit interval, the sequence shifts so that receiver circuit 12 is enabled while receiver circuit 14 is disabled and the output of receiver circuit 10 is stored. In the third bit interval, receiver circuit 14 is enabled while receiver circuit 10 is disabled and the output of receiver circuit 12 is stored. The foregoing sequence is thereafter repeated on a repetitive basis.

The output signals of a pair of the receiver circuits 10–14 are compared by sampling during each bit interval in the same aforementioned sequence through lowpass filters 44 and 46 whose respective outputs $\sin(\theta_n - \theta_{n+1})$ and $\cos(\theta_n - \theta_{n+1})$ represent the demodulated information for defining the two bits contained in each demodulated bit interval in accordance with the earlier depicted table. The inputs to lowpass filters 44 and 46 are derived respectively from the product outputs of two mixers 48 and 50. Mixer 50 affords the product directly of the receiver circuit output signal whose bit interval is to be demodulated via lead 52 with the output signal of the receiver circuit storing the immediately preceding bit interval as a reference via lead 54, while mixer 48 affords the product of the reference output signal directly with the demodulated bit interval output signal first shifted by 90° via phase shift circuit 56.

Sampling is accomplished by closing the appropriate pair of switches shown symbolically in response to a sample pulse generated by timing circuit 22 so as to connect to leads 52 and 54, respectively, the receiver circuit whose bit interval is to be demodulated and the immediately preceding receiver circuit in the sequence which establishes the reference against which a comparison is to be made. The pulses are shown in FIG. 2, alongside of which the first number represents the receiver circuit whose bit interval output is to be demodulated and the second number the receiver circuit whose output serves as a reference. Thus, in the first bit interval, switch 58 is closed to demodulate the output of receiver circuit 14 concurrently with switch 60 whose output serves as the reference. In the next bit interval, switch 62 is closed to demodulate the output of receiver circuit 10 while switch 64 is likewise closed to permit the output of receiver circuit 14 to serve as the reference. In the third bit interval, switch 66 is closed to demodulate the output of receiver circuit 12 with reference to the output of receiver circuit 10 by the closure of switch 68. The foregoing sequence would then be repeated on a repetitive basis. It is to be noted that in each bit interval for this three bit interval sequence, a receiver circuit is disabled only after its output is first employed as a reference signal in that interval. Thus, unlike the system described in the Carter patent, the system herein affords the demodulation of information contained in each bit interval in a bit interval other than the one in which it was transmitted and received, thus permitting the entire bit interval period T to be used for developing an output signal to be demodulated. This eliminates the need for a finite time during the interval to either sample or discharge the integrators, thereby permitting shorter bit intervals and resultant higher data rates. This also results in greater accuracy and simpler timing circuitry since plural functions are not performed in the transmitted and received bit interval.

As mentioned earlier, the embodiment of FIG. 1 lends itself to sequences of greater than three bit intervals by employing more receiver circuits. A notable alternative is the use of four receiver circuits which permits a four bit interval sequence to be employed with the third and fourth intervals being used respectively for providing the output signal as a reference and for disabling the receiver circuit. Segregation of these plural functions in different bit intervals thus extends the benefits afforded by the subject invention. This arrangement is pictorially depicted in the sample pulse waveform of FIG. 3 wherein the numerals 1-4 identify which of four receivers arranged in ascending numerical order is acted upon in the delineated manner.

Since undoubtedly modifications to the Detailed Description herein may occur to those skilled in the art which may not necessarily depart from the scope and spirit of the invention, the foregoing disclosure is intended to be merely exemplary and not circumscriptive of the invention as it will now be claimed hereinbelow.

What is claimed is:

1. A demodulator for synchronously detecting and demodulating information differentially encoded in the consecutive bit intervals of a carrier signal, the information being conveyed by some characteristic of the carrier signal, comprising:

at least three receiver circuits, each for receiving at its input the carrier signal when enabled, producing in response thereto an output signal indicative of the carrier signal characteristic at the time of enablement and storing it until disabled;

first switching circuit means for periodically enabling each of said receiver circuits to receive the carrier signal during an individual bit interval in a predetermined sequence;

second switching circuit means for periodically disabling said receiver circuits in said predetermined sequence, each disablement occurring in a bit interval separated from the associated interval in which the disabled receiver circuit was previously enabled by at least one bit interval;

comparison means for comparing and providing an indication of the carrier signal characteristic difference between two signals applied thereto, and third switching circuit means for periodically applying the outputs of a pair of said receiver circuits to said comparison means during each bit interval in said predetermined sequence, said pair being constituted by one of said receiver circuits after the termination of its enablement and the immediately preceding receiver circuit in said predetermined sequence prior to its disablement.

2. The demodulator of claim 1 wherein the associated disablement and enablement bit intervals are separated by one bit interval.

3. The demodulator of claim 1 wherein the associated disablement and enablement bit intervals are separated by two bit intervals.

4. The demodulator of claim 1 wherein the carrier signal characteristic is phase.

5. The demodulator of claim 1 wherein each of said receiver circuits comprises an integrator for developing and storing the output signal indicative of the characteristic and which is disabled by forcing its output to zero.

6. The demodulator of claim 1 wherein each enabling period is coincident with a bit interval.

7. A method of synchronously detecting the differentially encoded information contained in the consecutive bit intervals of a carrier signal, the information being conveyed by some characteristic of the carrier signal, comprising:

generating an output signal indicative of the characteristic in each bit interval during that interval;

storing the output signal for more than one bit interval following the bit interval in which it was generated;

comparing each stored output signal with the output signal which was stored for the immediately preceding bit interval to obtain the differentially encoded information, and forcing each stored output signal to zero after using it as a reference for comparison with the stored output signal for the immediately succeeding bit interval.

8. The method of claim 7 wherein the bit intervals for generating and removing the output signal are separated by one bit interval.

9. The method of claim 7 wherein the bit intervals for generating and removing the output signals are separated by two bit intervals.

10. The method of claim 7 wherein the carrier signal characteristic is phase.

* * * * *